United States Patent
Dai et al.

(10) Patent No.: US 9,187,081 B2
(45) Date of Patent: Nov. 17, 2015

(54) REGENERATIVE BRAKING AND TORQUE CONVERTER CONTROL

(71) Applicant: FORD GLOBAL TECHNOLOGIES, LLC, Dearborn, MI (US)

(72) Inventors: Zhengyu Dai, Canton, MI (US); Yanan Zhao, Ann Arbor, MI (US); Felix Nedorezov, Rochester Hills, MI (US); Mark S. Yamazaki, Canton, MI (US); Philip J. Wiethe, Jr., Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 202 days.

(21) Appl. No.: 14/036,338

(22) Filed: Sep. 25, 2013

(65) Prior Publication Data

US 2015/0087475 A1 Mar. 26, 2015

(51) Int. Cl.
*B60W 10/196* (2012.01)
*B60W 20/00* (2006.01)
*B60K 6/38* (2007.10)
*B60K 6/547* (2007.10)
*B60W 10/02* (2006.01)
*B60W 10/08* (2006.01)
*B60W 10/184* (2012.01)
*B60K 6/48* (2007.10)

(52) U.S. Cl.
CPC .............. *B60W 10/196* (2013.01); *B60K 6/38* (2013.01); *B60K 6/547* (2013.01); *B60W 10/026* (2013.01); *B60W 10/08* (2013.01); *B60W 10/184* (2013.01); *B60W 20/00* (2013.01); *B60W 20/1062* (2013.01); *B60K 2006/4825* (2013.01); *B60W 2510/0233* (2013.01); *B60W 2510/083* (2013.01); *B60W 2520/10* (2013.01); *B60W 2710/083* (2013.01); *B60W 2710/182* (2013.01); *B60W 2720/103* (2013.01); *B60Y 2300/89* (2013.01); *Y10S 903/947* (2013.01)

(58) Field of Classification Search
None
See application file for complete search history.

(56) References Cited

U.S. PATENT DOCUMENTS

| | | | |
|---|---|---|---|
| 5,615,933 A | 4/1997 | Kidston et al. | |
| 7,637,842 B2 | 12/2009 | Tamai et al. | |
| 7,713,166 B2 * | 5/2010 | Frank et al. | 477/45 |
| 7,828,693 B2 | 11/2010 | Soliman et al. | |
| 7,841,433 B2 | 11/2010 | Soliman et al. | |
| 8,016,367 B2 | 9/2011 | Hirata | |
| 8,055,422 B2 | 11/2011 | Yurgil | |
| 8,066,339 B2 | 11/2011 | Crombez et al. | |
| 8,311,718 B2 | 11/2012 | Jess et al. | |
| 2007/0107958 A1 * | 5/2007 | Oliver | 180/65.4 |
| 2007/0273204 A1 * | 11/2007 | Kodama et al. | 303/146 |

* cited by examiner

*Primary Examiner* — Justin Holmes
(74) *Attorney, Agent, or Firm* — David B. Kelley; MacMillan, Sobanski & Todd, LLC

(57) ABSTRACT

A method for controlling vehicle regenerative braking includes decreasing regenerative braking, provided a converter clutch is locked, such that regenerative braking torque reaches zero before a converter clutch opens due to vehicle speed reaching a reference speed; decreasing regenerative braking, provided the converter clutch is scheduled to open, such that regenerative braking torque reaches zero before the converter clutch opens due to vehicle speed reaching the reference speed; and braking the vehicle using wheel brakes.

17 Claims, 4 Drawing Sheets

REGENERATIVE BRAKING AND TORQUE CONVERTER CONTROL

BACKGROUND OF THE INVENTION

1. Field of the Invention

This invention relates generally to a method for controlling a regenerative braking event in a hybrid electric vehicle wherein blend-out control is coordinated with torque converter control.

2. Description of the Prior Art

In order to maximize fuel economy in a hybrid electric vehicle, energy saving through regenerative braking with the electrical motor during a brake event is an integral part of the system. A high voltage battery can be charged through regenerative braking while the vehicle is slowing down. On the other hand, to maintain vehicle safety, conventional friction braking is also used when regenerative braking by itself cannot meet the driver demand. At low speed before the regenerative braking becomes unavailable or inefficient; regenerative braking torque should be ramped down to zero gradually and the conventional friction braking torque should ramped up to the driver demand to facilitate smooth brake torque transition. This process is referred as regenerative braking torque blend-out. Thus the driver brake demand can be satisfied with acceptable vehicle drivability, fuel efficiency and vehicle safety.

In a modular hybrid electric vehicle, a step ratio transmission and torque converter are located between an electrical motor and the driving axle with wheels. During a regenerative braking event, through the transmission and the torque converter the vehicle kinetic energy charges the high voltage battery by rotating the electrical machine. The torque converter clutch must be locked in order to fully transmit the vehicle kinetic energy to the electrical motor. If the torque converter must be open, it would transmit much less vehicle kinetic energy. In this case, the regenerative braking torque blend-out should be completed before the torque converter opens to prevent stalling the electrical motor.

SUMMARY OF THE INVENTION

A method for controlling vehicle regenerative braking includes decreasing regenerative braking, provided a converter clutch is locked, such that regenerative braking torque reaches zero before a converter clutch opens due to vehicle speed reaching a reference speed; decreasing regenerative braking, provided the converter clutch is scheduled to open, such that regenerative braking torque reaches zero before the converter clutch opens due to vehicle speed reaching a the reference speed; and braking the vehicle using wheel brakes.

Fuel economy, drivability and vehicle safety are major concerns of hybrid electric vehicle control. The coordination between the torque converter and regenerative braking system control provides dynamic, real-time regenerative braking blend-out control that will benefit the fuel economy, the drivability and the vehicle safety. Firstly, the prediction and notification of the torque converter clutch open state allows regenerative braking system to fully utilize the opportunity to capture the kinetic energy as much as possible until the torque converter clutch is about to open. Secondly, the ramp curve supports a smooth torque transition.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
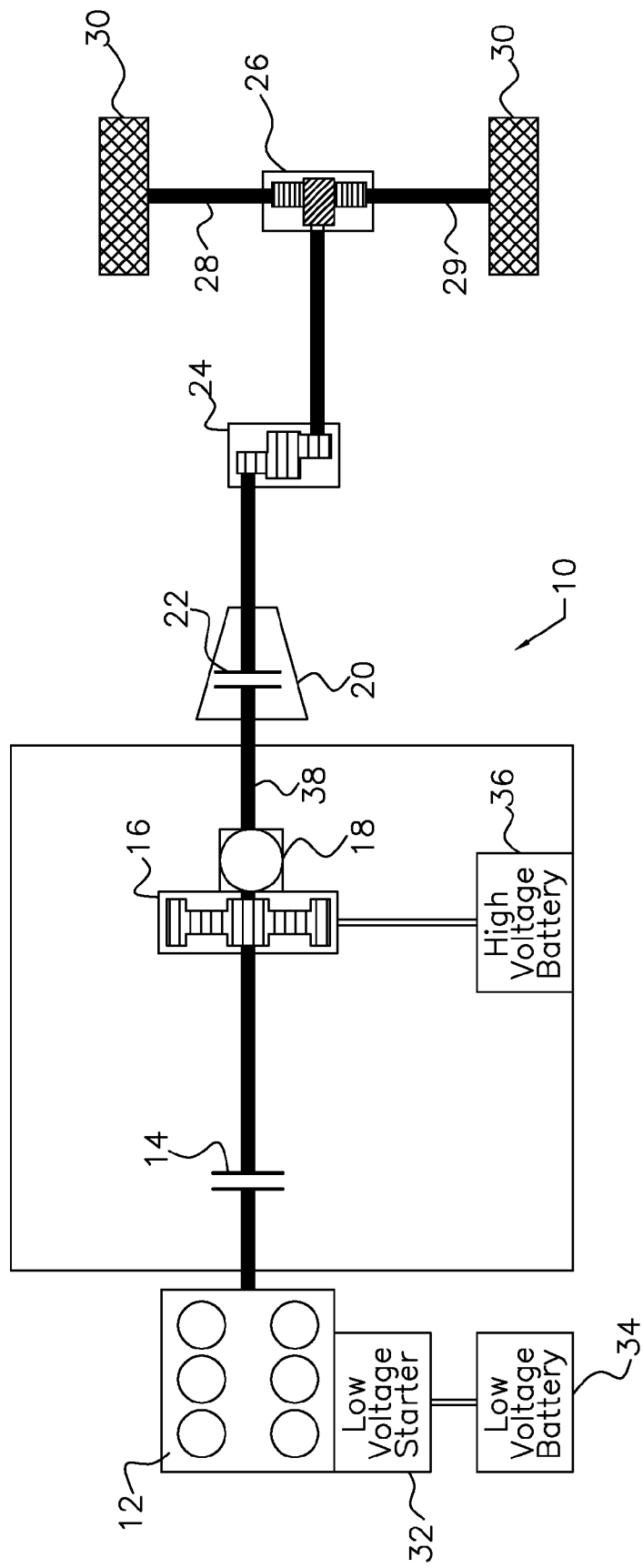
FIG. 1 is a schematic diagram showing a modular hybrid electric powertrain for a motor vehicle.

Referring first to FIG. 1, a parallel hybrid electric powertrain 10 includes an internal combustion engine 12, engine disconnect clutch 14, electric machine or motor/generator 16, transmission hydraulic pump 18, torque converter 20, torque converter lock-up clutch 22, transmission gearing 24, final drive gearing 26, shafts 28, 29, and driven wheels 30. A low voltage starter 32, powered by a low voltage battery 34, cranks the engine while starting the engine 12 and producing sustained combustion. A high voltage battery 36 powers the electric motor/generator 16.

The torque converter 20 is a hydraulic coupling that produces a hydrokinetic drive connection between an impeller, which is driveably connected to the engine 12 when clutch 14 is closed, and a turbine, which is driveably connected to the driven wheels 30.

The torque converter lock-up clutch 22 alternately opens and closes a drive connection between the torque converter's turbine and the shaft 38.

A vehicle equipped with this powertrain 10 can produce electric drive and hybrid electric drive and can charge the battery 36 either by regenerative braking, i.e., recovering and converting kinetic energy of the vehicle during a braking event to electric energy that can be stored in battery 36, or by using the engine to charge battery 36.

The fuel economy benefit in a hybrid electric vehicle results mainly from its ability to perform regenerative braking. In powertrain 10 motor 16 is coupled to the wheels through the torque converter 20, transmission gearing 24 and final drive 26. The torque converter 20 transmits torque through the combination of the hydraulic path and the mechanic path, provided the torque converter clutch 22 is slipping. If the torque converter clutch 22 is fully open, torque can only be transmitted through the hydraulic path. If the clutch 22 is fully locked, the torque can only be transmitted through the mechanical path.

During regenerative braking, torque is transmitted from the wheels 30 to the electric machine 16. If clutch 22 is open, the torque converter's ability to transmit torque in the reverse direction is very limited. To recoup most of the kinetic energy using regenerative braking, the torque converter clutch 22 should be kept locked while the vehicle is slowing down.

The torque converter clutch 22, however, must be opened for various reasons. When impeller speed is low, clutch 22 must be open so that the electric motor and/or engine 12 do not stall. When clutch 22 is open, the hydraulic path serves as coupling to deliver torque smoothly to the wheels 30.

The control coordinates regenerative braking system control and torque converter control. During regenerative braking operation, the vehicle control system coordinates the regenerative braking portion of the brake torque and the conventional friction portion of the brake torque to make sure the total brake torque meets the driver brake demand and the vehicle deceleration performance. If for any reason, the regenerative brake torque must be reduced, it must be controlled such that it reduces smoothly and the conventional friction brake torque fills in the gap concurrently. This control process is called Regen torque blend-out. Regenerative torque blend-out control should be transparent to the vehicle regenerative torque blend out operator regarding the source of the brake torque and the change in contribution to brake torque from the two sources, while maintaining an uncompromised overall vehicle deceleration performance and safety.

During regenerative torque blend-out control, the regenerative portion of the brake torque is reduced relative to the magnitude of total brake torque. This reduction is called regenerative torque ramp out.

Figure 2A:
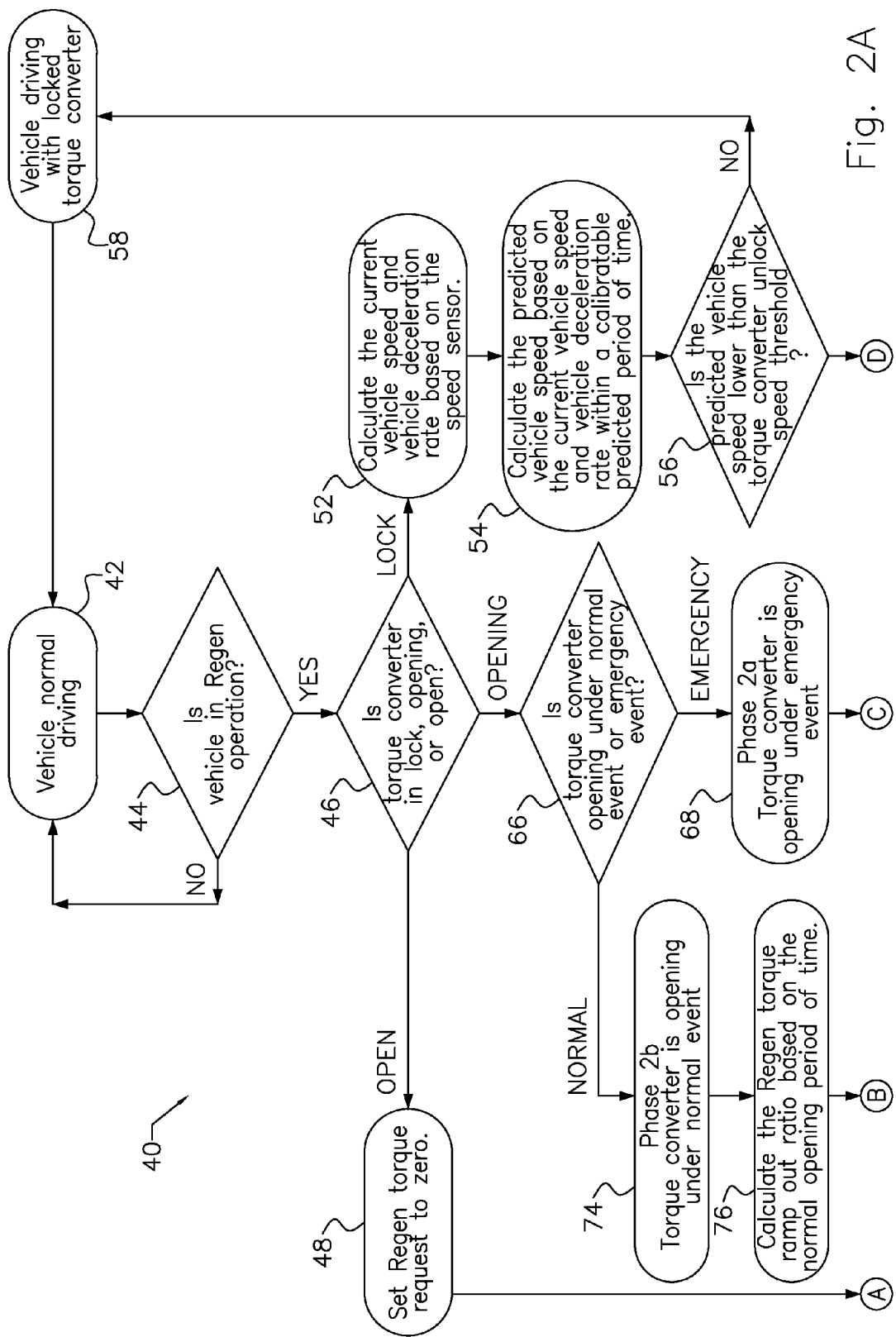
FIGS. 2A and 2B comprise a flow diagram of an algorithm for controlling regenerative brake torque blend-out in coordination with operation of the torque converter clutch.
Figure 2B:
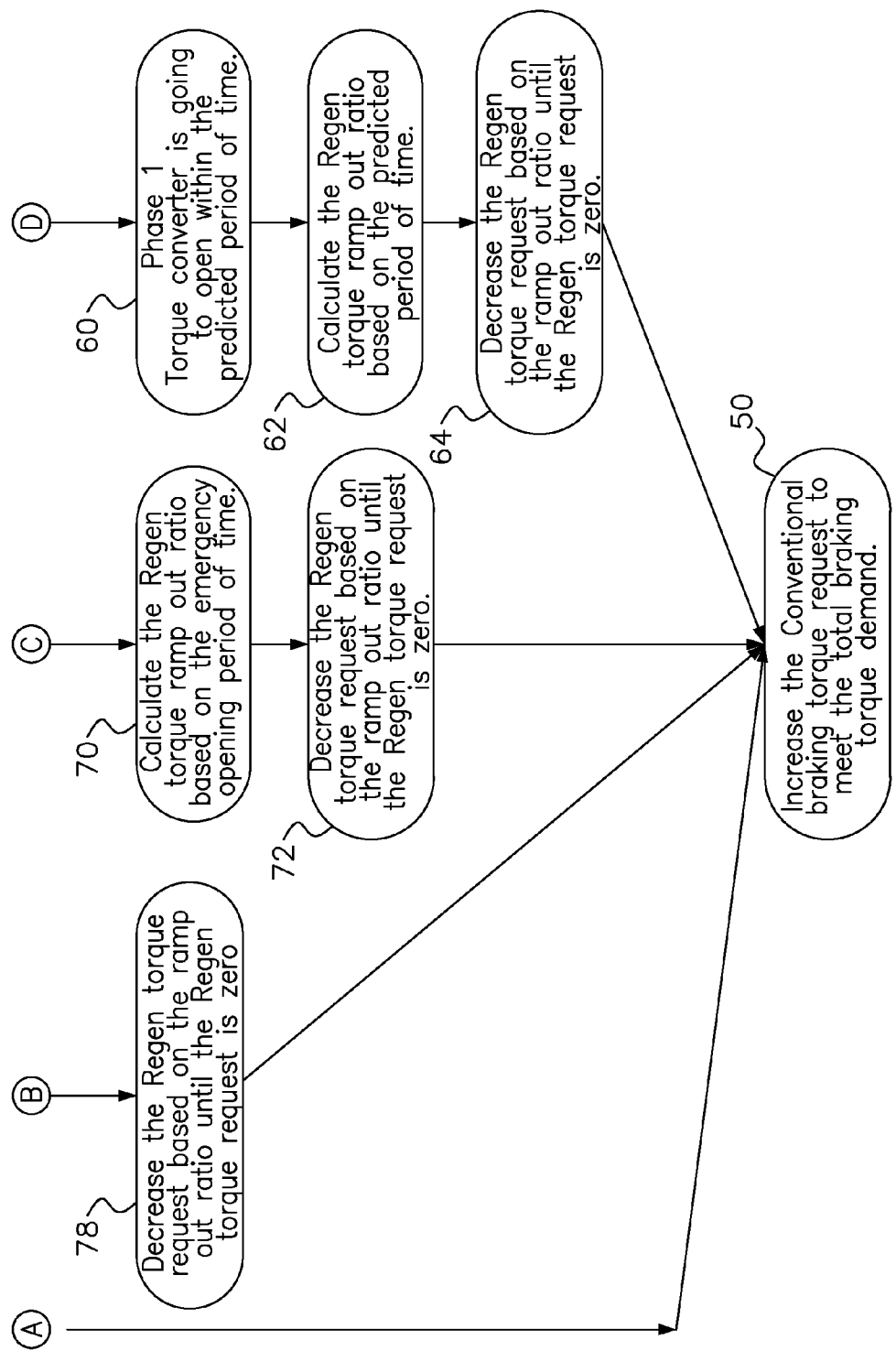
Figure 3:
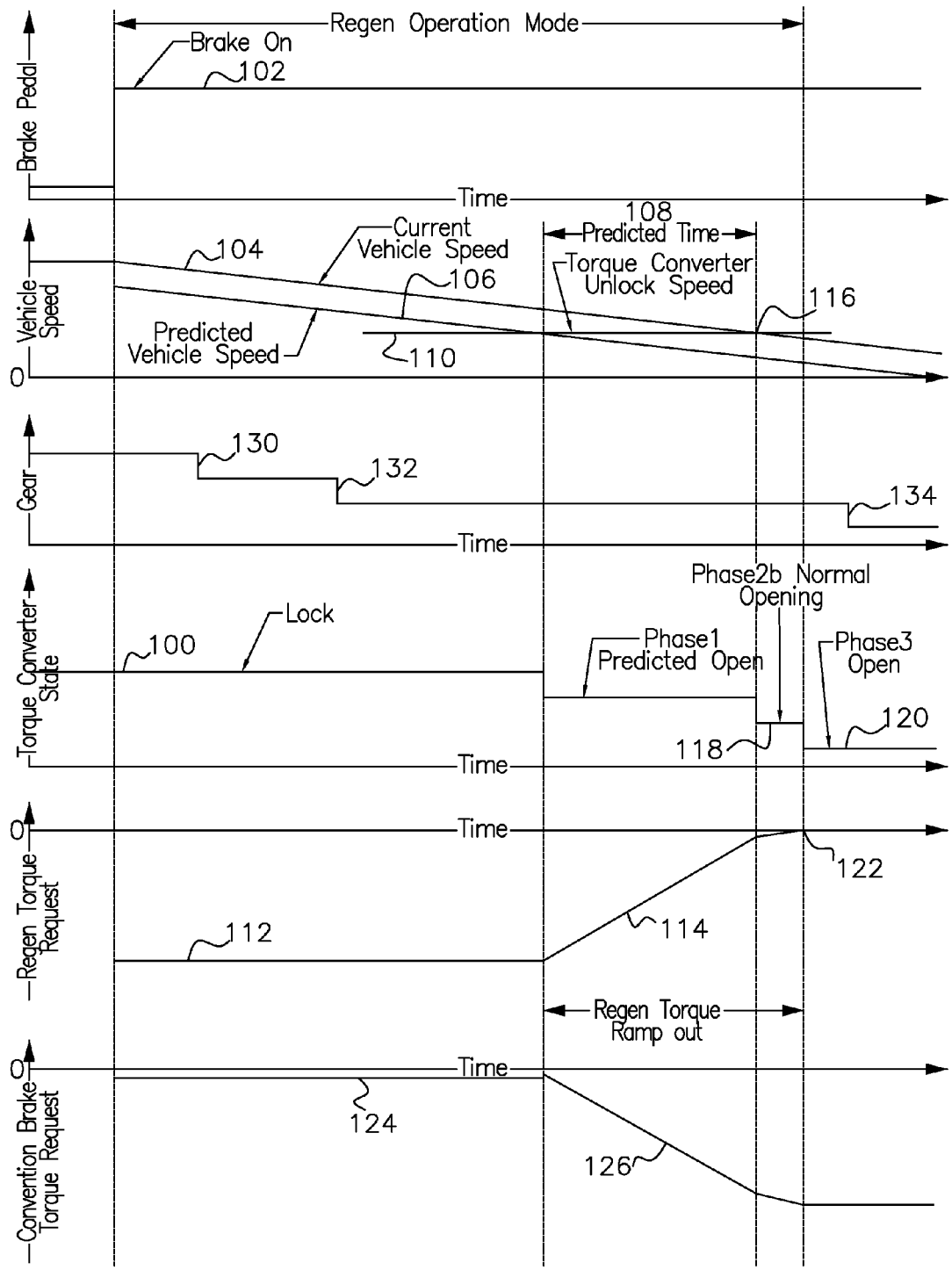
FIG. 3 comprises graphs that illustrate regenerative brake torque blend-out control coordinated with a torque converter control timing chart.

The flow diagram of FIGS. 2A and 2B illustrates steps of a control algorithm 40 for controlling regenerative brake torque blend-out in coordination with operation of the torque converter clutch 22. Control algorithm 40 is divided into three phases. In phase 1 the torque converter control predicts whether to open the torque converter within a period of time. If the torque converter is going to open, the control predicts the vehicle speed at which the torque converter opens. In phase 2, the torque converter control commands that the torque converter clutch 22 open and continues to monitor the state of clutch 22 during any normal and emergency torque converter open events. In phase 3, the control determines and reports the torque converter actual open state.

During regenerative braking operation, the vehicle control system coordinates the regenerative braking portion of the brake torque and the conventional friction portion of the brake torque to ensure that the total brake torque meets the driver brake demand and the vehicle deceleration performance. If for any reason the regenerative brake torque must be reduced, it must be controlled such that its reduction is smooth and the conventional friction brake torque fills in the gap concurrently. This control process is called regenerative brake torque blend out. Successful regenerative brake torque blend out control is transparent to the vehicle operator in terms of the brake torque source and contribution change and produces uncompromised overall vehicle deceleration performance and safety requirement.

During regenerative braking blend out control, the regeneration portion of the brake torque reduces its contribution to the total brake torque. This reduction of the regenerative braking portion of the brake torque is called regeneration torque ramp out.

Regenerative brake torque blend-out control will be aligned with the torque converter open control during all three phases. The regenerative brake torque blend-out is controlled through a ramp ratio which is designed to decrease monotonically during each phase, with different calibratable time durations, until the blend-out is completed. In phase 1 the blend-out time duration will be aligned with the time used in the torque converter open prediction. In phase 2, the time duration will be aligned with the torque converter opening actuation time under normal or emergency opening events. In phase 3, the regenerative brake torque will be reduced to zero immediately due to torque converter clutch state being open. To make sure the smooth torque transition, in phase 1 and 2, the ramp ratio change rate is calculated based on the expected time to complete the event and the difference of the target ramp ratio and the ramp ratio at the moment of the last torque converter phase change.

At step 42 the vehicle is running normally with no regenerative braking and the converter clutch 22 fully locked.

At step 44 a test is performed to determine whether regenerative braking is occurring. If the result of test 44 is logically false, control returns to step 42.

If the result of test 44 is logically true, at step 46 a test is performed to determine whether converter clutch 22 is locked, opening or open. If converter clutch 22 is open, Phase 3 control begins at step 48 by setting any regenerative brake torque request to zero. Then control advances to step 50 where conventional brake torque, i.e., wheel brake torque produced by friction, is increased to meet the entire vehicle braking torque demand.

If test 46 indicates that converter clutch 22 is locked, at step 52 the current vehicle speed and vehicle deceleration rate are determined based on the output of a suitable speed sensor or sensors.

At step 54 the predicted vehicle speed based on the current vehicle speed and vehicle deceleration rate within a calibratable predicted period of time is determined.

At step 56 a test is performed to determine whether the predicted vehicle speed is lower than a reference torque converter unlocking speed. If the result of test 56 is negative, control returns to step 42 after ensuring at step 58 that the vehicle is operating with converter clutch 22 locked.

If the result of test 56 is positive, at step 60 Phase 1 control begins because torque converter clutch 22 is going to open within the predicted period.

At step 62, a regenerative brake torque ramp-out ratio is established based on the length of the predicted period.

At step 64, the regenerative brake torque request is decreased based on the ramp-out ratio until the regenerative brake torque request is zero. Control then advances to step 50.

If test 46 indicates that converter clutch 22 is opening, at step 66 a test is performed to determine whether torque converter clutch 22 is opening under a normal event or an emergency event?

If the result of test 66 indicates that an emergency event is causing converter clutch 22 to open, at step 68 Phase 2a begins because torque converter clutch 22 is opening under an emergency event.

At step 70, a regenerative brake torque ramp-out ratio is established based on the length of the emergency opening period.

At step 72, the regenerative brake torque request is decreased based on the ramp-out ratio until the regenerative brake torque request is zero. Control then advances to step 50.

But if the result of test 66 indicates that a normal event is causing converter clutch 22 to open, at step 74 Phase 2b begins because torque converter clutch 22 is opening under a normal event.

At step 76, a regenerative brake torque ramp-out ratio is established based on the length of the normal opening period.

At step 78, the regenerative brake torque request is decreased based on the ramp-out ratio until the regenerative brake torque request is zero. Control then advances to step 50.

FIG. 4 illustrates a typical regenerative braking operation event in a MHT hybrid electric vehicle. Regenerative braking occurred while the torque converter was locked 100 and the vehicle operator initiated a brake demand typically by stepping on the brake pedal 102. The total negative brake torque, which includes both regenerative braking torque and conventional friction brake torque, met the driver brake torque demand. The regenerative braking torque was used in the electrical motor 16 to charge high voltage battery 36.

During regenerative braking, the vehicle decelerates while vehicle speed decreases at a certain deceleration rate 104. Based on the vehicle speed and the vehicle deceleration rate, a predicted vehicle speed 106 within a calibrateable predicted period window 108 is calculated. When this predicted vehicle speed 106 crosses below the torque converter unlock speed threshold 110, the torque converter clutch 22 is predicted to open within the predicted period 108. The negative regenerative braking torque 112 is then ramped-out 114 during and based on the predicted period 108.

When the actual vehicle speed 104 crosses below the torque converter unlock speed threshold 110 at 116, the torque converter clutch 22 is in opening phase 118. The regenerative braking torque is continually ramped out based on the opening time if not ramping out to zero yet.

When the torque converter clutch 22 is actually open 120, the regenerative braking torque would be set to zero immediately at 122 if not ramping out to zero yet. This would ensure no regenerative braking while torque converter clutch 22 opened.

In the meantime, throughout the regenerative braking event, the conventional friction brake torque 124 is controlled to fill in any gap due to the regenerative braking torque change. Thus the total negative brake torque 126 always meets the driver brake torque demand.

Gear ratio changes may occur during the regenerative braking event at 128, 130 and 132.

In accordance with the provisions of the patent statutes, the preferred embodiment has been described. However, it should be noted that the alternate embodiments can be practiced otherwise than as specifically illustrated and described.

The invention claimed is:

1. A method for controlling regenerative braking, comprising:
   (a) using wheel brake torque and regenerative braking torque to brake a vehicle;
   (b) decreasing regenerative braking torque during a period at a rate set such that regenerative braking torque reaches zero before a converter clutch opens;
   (c) increasing wheel brake torque as regenerative braking torque decreases.

2. The method of claim 1, wherein:
   decreasing regenerative braking is performed provided a converter clutch is locked; and
   the converter clutch opens due to vehicle speed reaching a reference vehicle speed.

3. The method of claim 1, wherein:
   decreasing regenerative braking is performed provided the converter clutch is scheduled to open; and
   the converter clutch opens due to vehicle speed reaching a reference speed.

4. The method of claim 1, wherein step (b) further comprises:
   predicting a speed of the vehicle that shall occur at an end of the period;
   establishing a rate of reduction of regenerative braking torque that shall occur during said period such that regenerative braking torque shall be zero at the end of said period, provided said predicted speed is less than a reference vehicle speed; and
   decreasing regenerative brake torque at said rate during said period.

5. The method of claim 4, wherein predicting the speed of the vehicle that shall occur at an end of the period is calculated with reference to current vehicle speed, current vehicle deceleration and a length of said period.

6. The method of claim 4, further comprising operating the vehicle with the converter clutch locked, provided said predicted speed is less than the reference vehicle speed.

7. A method for controlling vehicle regenerative braking, comprising:
   (a) decreasing regenerative braking, provided a converter clutch is locked, such that regenerative braking torque reaches zero before a converter clutch opens due to vehicle speed reaching a reference speed;
   (b) decreasing regenerative braking, provided the converter clutch is scheduled to open, such that regenerative braking torque reaches zero before the converter clutch opens due to vehicle speed reaching the reference speed.

8. The method of claim 7, further comprising producing no regenerative braking while the converter clutch is open.

9. The method of claim 7, further comprising using wheel brake torque and regenerative braking torque to brake the vehicle.

10. The method of claim 7, wherein step (a) further comprises:
    predicting a speed of the vehicle that shall occur at an end of a predetermined period;
    establishing a rate of reduction of regenerative braking torque that shall occur during said predetermined period such that regenerative braking torque shall be zero at the end of said predetermined period, provided said predicted speed is less than the reference speed; and
    decreasing regenerative brake torque at said rate during said predetermined period.

11. The method of claim 10, wherein predicting the speed of the vehicle that shall occur at an end of a predetermined period is calculated with reference to current vehicle speed, current vehicle deceleration and a length of said predetermined period.

12. The method of claim 10, further comprising operating the vehicle with the converter clutch locked, provided said predicted speed is less than the reference speed.

13. The method of claim 7, wherein step (b) further comprises:
    predicting a speed of the vehicle that shall occur at an end of a period at which the converter clutch will open;
    establishing a rate of reduction of regenerative braking torque to occur during a predetermined period such that regenerative braking torque shall be zero at the end of said predetermined period; and
    decreasing regenerative brake torque at said rate during said predetermined period.

14. A method for controlling vehicle regenerative braking, comprising:
    using wheel brake torque and regenerative braking torque to brake a vehicle;
    predicting a period that shall have expired before a converter clutch opens;
    establishing a rate of reduction of regenerative braking torque that shall occur during said period such that regenerative braking torque shall be zero at an end of said period; and
    decreasing regenerative braking torque at said rate during said period.

15. The method of claim 14, further comprising producing wheel brake torque at a magnitude sufficient to meet a vehicle braking requirement as regenerative braking torque decreases.

16. The method of claim 14, wherein:
decreasing regenerative braking is performed provided the converter clutch is locked; and
the converter clutch opens due to vehicle speed reaching a reference vehicle speed.

17. The method of claim 14, wherein:
decreasing regenerative braking is performed provided the converter clutch is scheduled to open.

\* \* \* \* \*